United States Patent
Lessard et al.

(10) Patent No.: US 9,728,287 B2
(45) Date of Patent: Aug. 8, 2017

(54) PACKAGING FOR DECOMMISSIONED AND DISMANTLED NUCLEAR REACTORS AND REACTOR COMPONENTS

(71) Applicant: AREVA Inc., Lynchburg, VA (US)

(72) Inventors: Leo Paul Lessard, Clinton, MA (US); Adam Mancini, Galway, NY (US); Richard James Furr, Matthews, NC (US); Matthieu P. Lucas, Rockville, MD (US); Donald R. LeFrancois, Marlborough, MA (US)

(73) Assignee: Areva Inc., Lynchburg, VA (US)

( * ) Notice: Subject to any disclaimer, the term of this patent is extended or adjusted under 35 U.S.C. 154(b) by 120 days.

(21) Appl. No.: 14/874,219

(22) Filed: Oct. 2, 2015

(65) Prior Publication Data
US 2017/0098484 A1  Apr. 6, 2017

(51) Int. Cl.
*G21F 9/30* (2006.01)
*G21D 1/00* (2006.01)
*A62D 3/33* (2007.01)

(52) U.S. Cl.
CPC .............. *G21D 1/003* (2013.01); *A62D 3/33* (2013.01); *G21F 9/301* (2013.01)

(58) Field of Classification Search
CPC ... G21F 9/30; G21F 9/302; G21F 9/12; B09B 3/0041
USPC ............................................................ 588/2
See application file for complete search history.

(56) References Cited

U.S. PATENT DOCUMENTS

| | | |
|---|---|---|
| 4,818,472 A | 4/1989 | Operschall |
| 5,297,182 A | 3/1994 | Cepkauskas |
| 2004/0231654 A1 | 11/2004 | Parsells |

FOREIGN PATENT DOCUMENTS

| | | |
|---|---|---|
| DE | 10 2012 208 240 A1 | 11/2013 |
| EP | 0 529 886 A1 | 3/1993 |
| JP | 2000-56071 A | 2/2000 |
| RU | 2 069 395 C1 | 11/1996 |

OTHER PUBLICATIONS

Partial European Search Report mailed May 23, 2016, issued in corresponding European Application No. 15197150.4, filed Nov. 30, 2015, 8 pages.

*Primary Examiner* — Edward Johnson
(74) *Attorney, Agent, or Firm* — Christensen O'Connor Johnson Kindness PLLC (57) ABSTRACT

A method of decommissioning a nuclear reactor including a vessel defining an inner chamber and reactor internal components positioned within the inner chamber includes removing at least some of the internal components and repackaging at least some of the removed internal components in at least one of the first and second predefined sections of the vessel defining a cutting zone between the at least first and second predefined sections. The method further includes disposing the vessel in a container, and encapsulating the internal components in the vessel and encapsulating the vessel in the container to generate a package. A package including components from a decommissioned and dismantled nuclear reactor includes a vessel and a plurality of components encapsulated in the vessel.

20 Claims, 10 Drawing Sheets

PACKAGING FOR DECOMMISSIONED AND DISMANTLED NUCLEAR REACTORS AND REACTOR COMPONENTS

BACKGROUND

Nuclear energy originates with a nuclear reaction within a "nuclear reactor". A nuclear reactor typically includes a vessel defining a chamber and a core including internal components situated within the chamber. In commercial power reactors, for example, the core includes a plurality of internal components arranged to accommodate the fuel assemblies and measurement devices/probes. The nuclear reaction releases energy, transferring heat to a circulating fluid.

The nuclear reactor core is the location where the chain reaction of nuclear fission occurs and generates energy. Nuclear fissions also induce irradiation of the nuclear reactor core components and thus generate various irradiated materials. For example, the inside of the vessel, as well as the reactor internal components, are considered irradiated. To comply with pertaining regulations for dismantling and decommissioning a nuclear reactor at the end of its operating life, the irradiated materials require certain procedures/processes for handling.

Removal and disposal of a nuclear reactor's fuel core is not considered part of the decommissioning process because used nuclear fuel disposal is subject to a different process. However, the decommissioning of the remaining portions the nuclear reactor core, for example, the vessel and the reactor internal components, are described in the present application.

Many nuclear power plants will be shut down in the coming future, whether such shutdowns are scheduled or premature. Therefore, there exists a need for a process with improved efficiency and safety for decommissioning a nuclear reactor vessel and internal components.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a method of decommissioning a nuclear reactor including a vessel defining an inner chamber and reactor internal components positioned within the inner chamber is provided. The method includes removing at least some of the internal components; repackaging at least some of the removed internal components in at least one of the first and second predefined sections of the vessel defining a cutting zone between the at least first and second predefined sections; disposing the vessel in a container; and encapsulating the internal components in the vessel and encapsulating the vessel in the container to generate a package.

In accordance with another embodiment of the present disclosure, a package including components from a decommissioned and dismantled nuclear reactor is provided. The package includes a vessel encapsulated in a container, and a plurality of components encapsulated in the vessel, wherein the nuclear components are configured to define one or more cutting zones in the vessel for cutting the package into a plurality of sections.

In any of the embodiments described herein, a method may further include cutting the vessel substantially along a plane through the cutting zone to divide the package into at least two sub-packages.

In any of the embodiments described herein, a method may further include affixing end caps to the sub-packages after cutting the package into sub-packages.

In any of the embodiments described herein, the end caps may have a skirt.

In any of the embodiments described herein, the internal components may be entirely contained within at least one of the first and second predefined sections.

In any of the embodiments described herein, repackaging the internal components may include repositioning the internal components and inserting a cutting zone in the vessel.

In any of the embodiments described herein, the cutting zone may include first and second dividers spaced a predetermined distance from one another to define a space therebetween.

In any of the embodiments described herein, a cutting material may be disposed between the first and second dividers.

In any of the embodiments described herein, defining the cutting zone may include inserting a prefabricated divider assembly including first and second dividers.

In any of the embodiments described herein, defining the cutting zone may include inserting first and second dividers in the vessel, the first and second dividers spaced a predetermined distance from one another.

In any of the embodiments described herein, a method may further include disposing a cutting material between the first and second dividers.

In any of the embodiments described herein, a divider may act as the cutting zone.

In any of the embodiments described herein, encapsulating the internal components in the vessel may include encapsulating using a first material.

In any of the embodiments described herein, the first material may be selected from the group consisting of cementitious grout, epoxy grout, resin, glass, and plastic or a mix thereof.

In any of the embodiments described herein, the cutting zone may include a second material as a filling material.

In any of the embodiments described herein, the second material may be selected from the group consisting of cementitious grout, epoxy grout, resin, glass, and plastic or a mix thereof.

In any of the embodiments described herein, the second material may be the same or different from the third material.

In any of the embodiments described herein, encapsulating the vessel in the container may include encapsulating using a third material.

In any of the embodiments described herein, the third material may be selected from the group consisting of cementitious grout, epoxy grout, resin, glass, and plastic or a mix thereof.

In any of the embodiments described herein, the dividers may be made from a structural material.

In any of the embodiments described herein, the dividers may be attached to the interior surface of the vessel.

In any of the embodiments described herein, the dividers may include one or more pathways to allow the encapsulation material to pass through to adjacent sections.

In any of the embodiments described herein, a method may further include repackaging and/or rearranging at least some of the internal components in at least first, second, and third predefined sections of the vessel.

In any of the embodiments described herein, a method may further include packaging other irradiated components from the nuclear reactor into the vessel prior to encapsulating.

In any of the embodiments described herein, selected internal components positioned within at least one of the first and second predetermined sections may remain within the vessel.

In any of the embodiments described herein, the container may include exterior circumferential grooves to align with the cutting zone in the vessel.

In any of the embodiments described herein, a method may further include using a diamond wire to cut the cutting zones in the vessel.

In any of the embodiments described herein, a method may further include using the grooves to guide the diamond wire.

In any of the embodiments described herein, the dividers may include at least two dividing plates distanced from one another to create a space therebetween.

In any of the embodiments described herein, at least a portion of the cladding of the vessel interior may be removed prior to repackaging near or at the cutting zones.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of the features described herein.

Embodiments of the present disclosure relate to methods for decommissioning and dismantling a nuclear reactor core. In accordance with methods described herein, an optimized segmentation method can be used for decommissioning nuclear core components, for example, the reactor vessel and internal components.

In previously developed decommissioning methods, a "one-piece" decommissioning method has been used. The method typically includes removing the Greater-Than-Class-C(GTCC) components from the reactor vessel internal components and loading the GTCC components in storage canisters typically stored in a dry used fuel storage facility known as an Independent Spent Fuel Storage Installation (ISFSI). The remaining reactor vessel internal components are then encapsulated inside the reactor vessel, for example in a cementitious grout. The resulting package is then encapsulated in a container and shipped in one piece to the disposal site.

In another previously developed method, a "full segmentation" method includes segmenting all of the reactor vessel internal components and the vessel itself into pieces to be packaged in standardized containers, shipped, and disposed of at a disposal site. Such a process is described in U.S. Pat. No. 5,297,182, issued to Cepkauskas.

The "one-piece" method has many advantages over the "full segmentation" method, including reducing the amount of work required inside the reactor or containment building, the radioactivity dose to workers, and the impact on the general population by shipping a limited number of radioactive waste shipments. However, the one-piece approach may not be feasible for larger commercial nuclear power plants given the locations and available transportation methods associated with current licensed disposal sites. For example, the one-piece method was efficient and cost effective to decommission the 60 megawatt reactor at the Shippingport Power Plant. The Shippingport reactor core was successfully shipped offsite in one-piece in December 1988.

Given the restrictions on accessing disposal sites for larger reactors in use today, the nuclear decommissioning industry has moved toward the full segmentation approach to decommission the larger-scale nuclear reactor core components.

Figure 1:
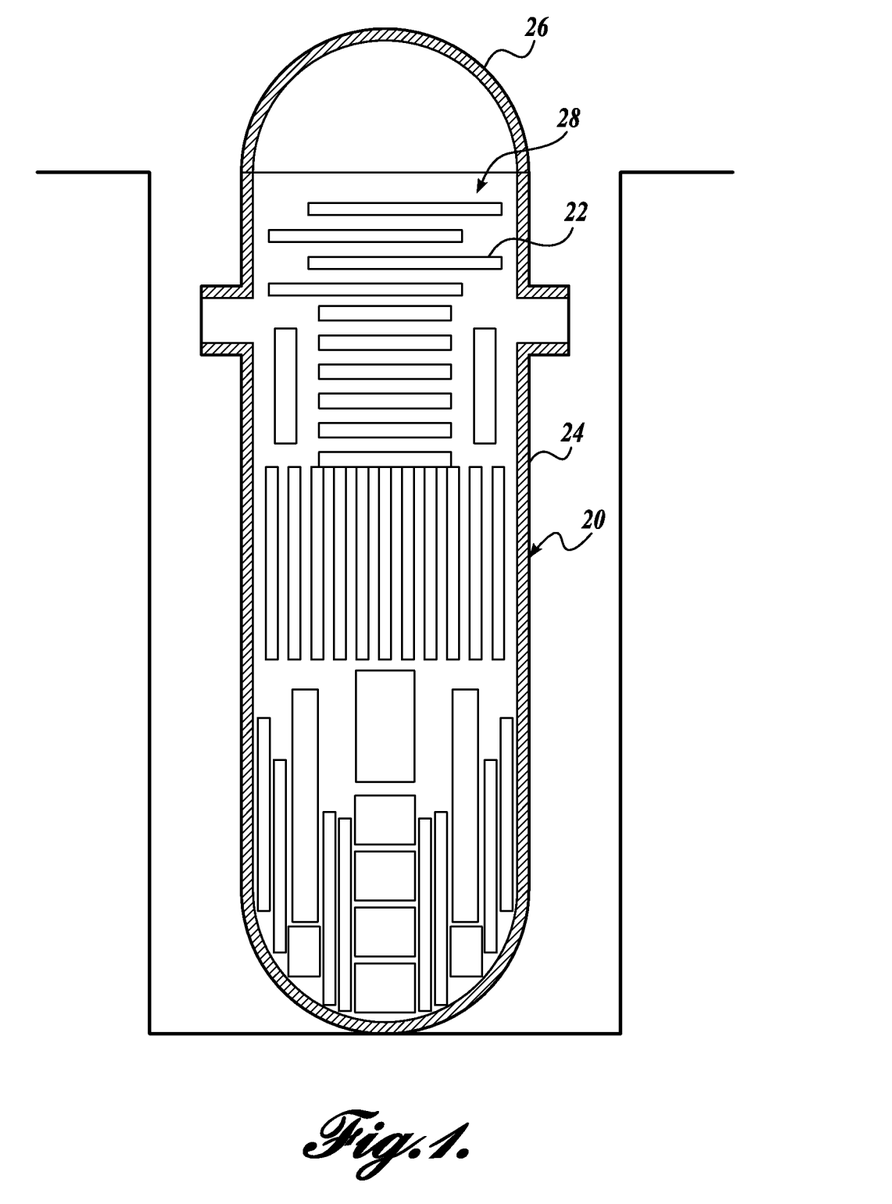
FIG. 1 is a cross-sectional view of a nuclear reactor vessel filled with internal components in accordance with one embodiment of the present disclosure.

In accordance with embodiment of the present disclosure, the "Optimized Segmentation" method as described herein presents a hybrid approach of the "one-piece" and "full segmentation" methods and considers the constraints of decommissioning large nuclear reactor core components. Referring to FIG. 1, an "Optimized Segmentation" method includes obtaining a reactor vessel 20 in an underwater pool, the reactor vessel 20 including internal components 22. The vessel 20 includes a body 24 and a top closure head 26.

Figure 2:
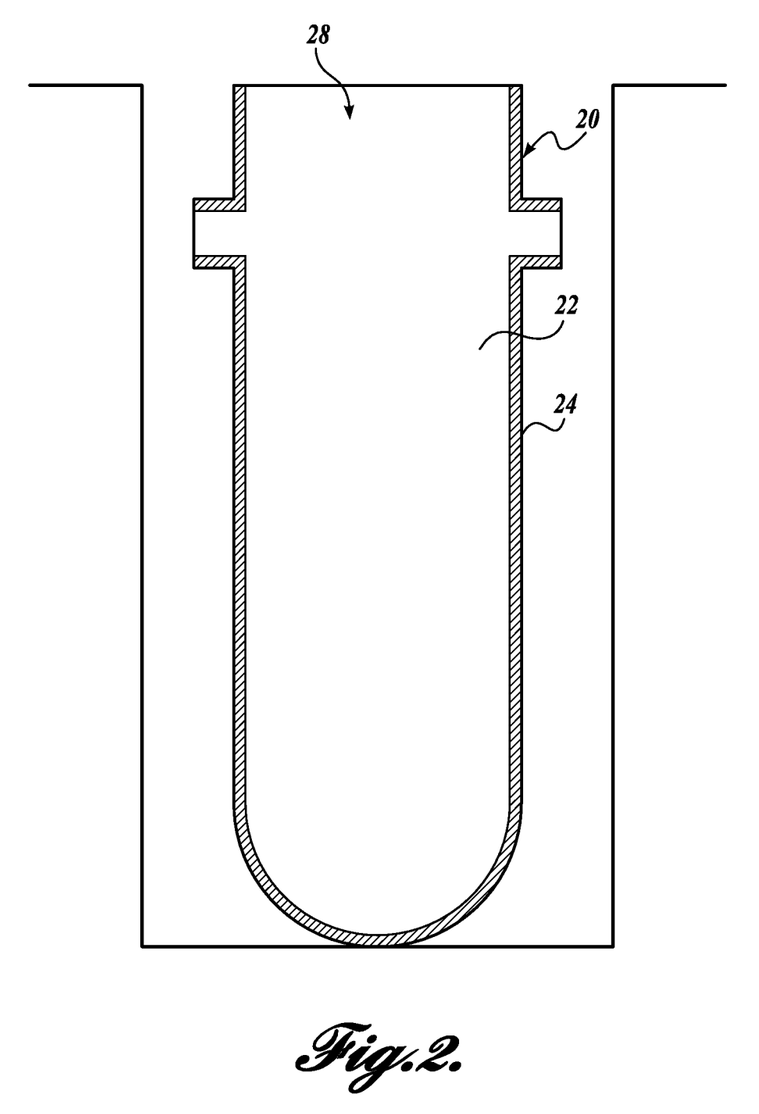
FIG. 2 is a cross-sectional view of the nuclear reactor vessel of FIG. 1 with internal components removed.

Referring to FIG. 2, removing the top closure head 26 provides access to the inner chamber 28 of the vessel 20, from which internal components 22 can be removed. When the internal components 22 have been removed, inner cladding and/or a portion of the inner wall material on the inner surface of the vessel 20 may be removed to accommodate a low radioactivity cut zone through the vessel 20 using segmentation technology, such as a diamond wire, as described in greater detail below. It should be appreciated that removal of the inner cladding may include removal of only a portion of the inner cladding, for example, removal of the inner cladding at or near the cutting zone 46 of the vessel 20, as described in greater detail below. The removal of the inner cladding at or near the cutting zone 46 aids in the cutting of the wall of the vessel 20.

Removal of part or all of the reactor vessel inner cladding and/or reactor vessel shell may be performed using one or more different techniques, such as milling, sandblasting, high pressure water, etc. An abrasive water jet may be used to remove the cladding or shell material when positioned at the adequate distance away from the material to be removed and using a special end effector tool. The target removal areas and removal depth depend on the optimization pattern parameters.

The repackaged internal components 22 may fall under different classifications within the regulations for disposal of radioactive waste. Each package must meet the disposal site's acceptance criteria and license requirements. These requirements may require removal of some internal components to meet the criteria, such as curie limitations. After the internal components are removed from the reactor vessel, internal components can be segmented, when necessary, using a technology such as abrasive water jet.

Figure 3:
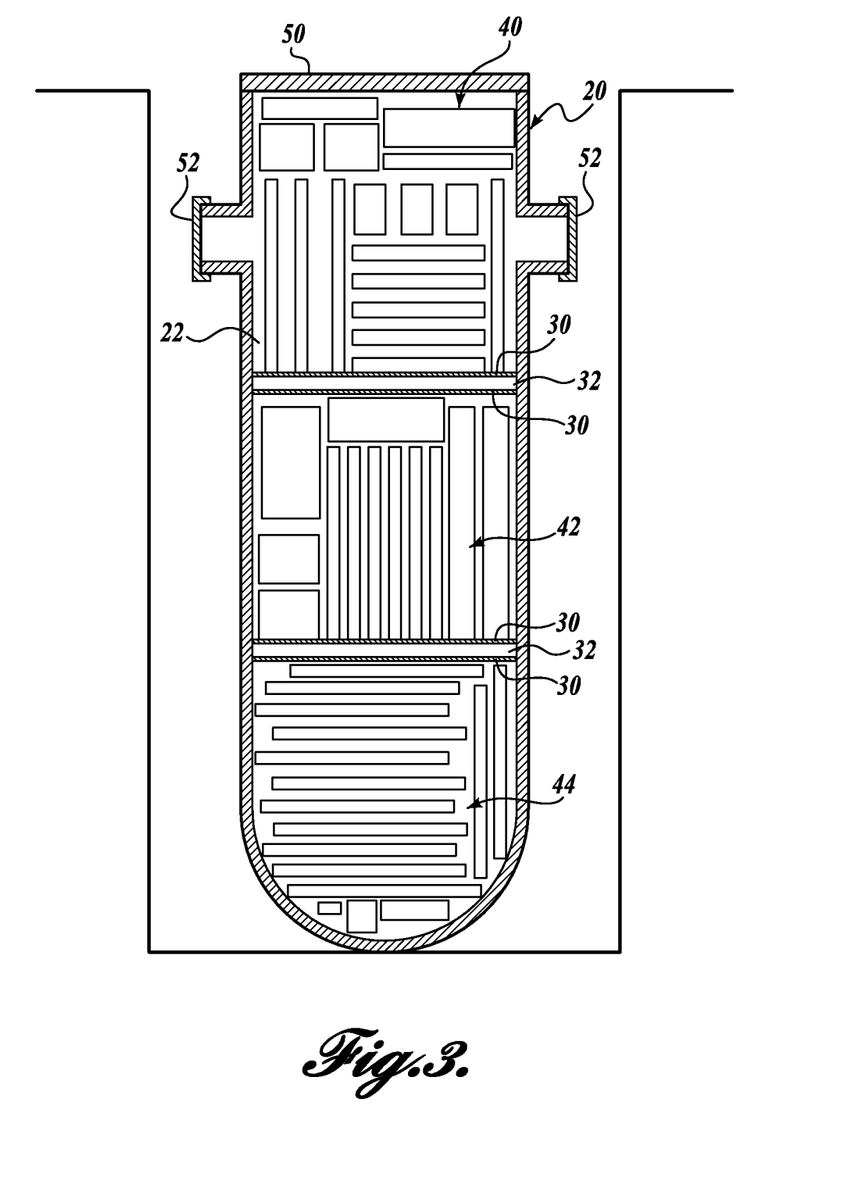
FIG. 3 is a cross-sectional view of the nuclear reactor vessel of FIG. 2 with internal components repackaged into a plurality of sections of the vessel defining cutting zones between adjacent sections.

Referring to FIG. 3, the internal components 22 are rearranged and reinserted into the vessel 20 using dividers 30 to create a plurality of sections 40, 42, 44 inside the vessel 20 and also to create a space region 32 between adjacent sections 40, 42, and 44. In the illustrated embodiment, the internal components 22 are rearranged into three sections 40, 42, and 44. However, it should be appreciated that any other plurality of sections is within the scope of the present disclosure.

In accordance with embodiments of the present disclosure, at least some of the internal components 22 are rearranged and repackaged into the vessel 20. In one embodiment, all or substantially all of the internal components 22 may be rearranged and repackaged in the vessel 20. Alternatively or in addition, some of the original internal components 22 can be left in the vessel 20 in a predetermined section 40, 42, or 44. Alternatively or in addition, other components which are not internal components to the vessel 20, such as nozzles, insulation, instrumentation, and secondary waste, can also be inserted into the vessel 20 prior to encapsulation.

Dividing sections 42 and 44 is a space region 32 between sections 42 and 44 defining an unencumbered cutting zone 46. An unencumbered cutting zone 46 refers to a cutting zone free or substantially free of highly irradiated radioactive material. Spacing the compartmented internal components 22 as described in this patent is one example of a method to create an unencumbered cutting zone 46. Embodiments of the present disclosure are directed to systems and methods for creating compartments inside the vessel 20 for the purpose of creating an unencumbered cutting zone 46.

As a non-limiting example and depending on the cutting technology parameters and accuracy, a suitable thickness for the unencumbered cutting zone 46 may be in the range of about 6 inches to about 12 inches. The space region 32 may be empty or may be filled with a suitable material 54, such as grout.

In the illustrated embodiment, two dividers 30 are positioned adjacent each other to create a space region 32 between the adjacent dividers 30. The dividers 30 may be designed to provide appropriate shielding in the cutting zone 46 after the sections 40, 42, and 44 have been cut (see FIG. 10). Therefore, the dividers 30 may be designed with considerations for relevant material and thickness for shielding purposes. In one embodiment of the present disclosure, the dividers 30 may be metal plates, such as alloys of steel, lead, nickel, or other metals. The dividers 30 may also include neutron absorbing materials. In other embodiments of the present disclosure, the dividers 30 may be other non-metal structural materials, such as plastic or another inorganic material.

The dividers 30 may be discrete plates or may be an assembly of multiple parts. As a non-limiting example of multiple parts, the dividers 30 may include several angled sections or any variation/configuration of material that would result in creating an unencumbered area for the purpose of enhancing the segmentation ease and performance. As another non-limiting example of multiple parts, the dividers 30 may be created by a set of rods that that create a space region 32 between two sections, for example, between sections 40 and 42.

The dividers 30 may be attached to the interior surface of the vessel 20. In that regard, the dividers may be welded, fastened, or otherwise affixed to the interior surface of the vessel 20. In another embodiment, the dividers 30 are not affixed to the interior surface of the vessel 20 prior to encapsulation.

A suitable thickness for the dividers 30 may be in the range of about 1 inch to about 6 inches depending on the radioactivity of the components. The dividers 30 may be sized based on a neutron activation analysis of the specific nuclear reactor core of the nuclear power plant that is undergoing decommissioning activities.

The dividers 30 are used to separate the internal components 22 in the vessel 20. In the illustrated embodiment, internal components 22 are reconfigured in a "smart" configuration, which may facilitate the cutting of the overall package (see FIG. 9), and the transportation and disposal of the sub-packages (see FIG. 10). In that regard, the internal components 22 are reconfigured from their original configuration (see FIG. 1) to a smart configuration (see FIG. 3) to avoid cutting through any internal components 22 when cutting is performed (see FIG. 9). In that regard, the internal components 22 are entirely contained within the predetermined sections 40, 42, 44.

The dividers 30 may be designed to work by pairs, each pair of dividers delimiting space region 32 forming a cutting zone 46 between the pair of dividers 30. Alternatively, a divider may be a prefabricated element having a sufficient thickness to form a cutting zone as such before installation into the vessel 20. It can be pre-filled with a filling material before installation in the vessel 20 or it can be filled with an encapsulation material after installation in the vessel 20.

Referring to FIG. 3, the internal components 22 may be rearranged and reinserted into the vessel 20 in a manner to create optimized sections considering constraints on dimension, weight, and waste classification. Although the nuclear reactor core design is an important aspect in understanding and planning the segmentation phase of the large package, a variety of reactor designs exist. Therefore, an optimization pattern will vary depending on the nuclear power plant. Such optimization can lead to reducing the overall nuclear reactor core decommissioning costs (including package, transportation, and disposal costs).

Figure 4:
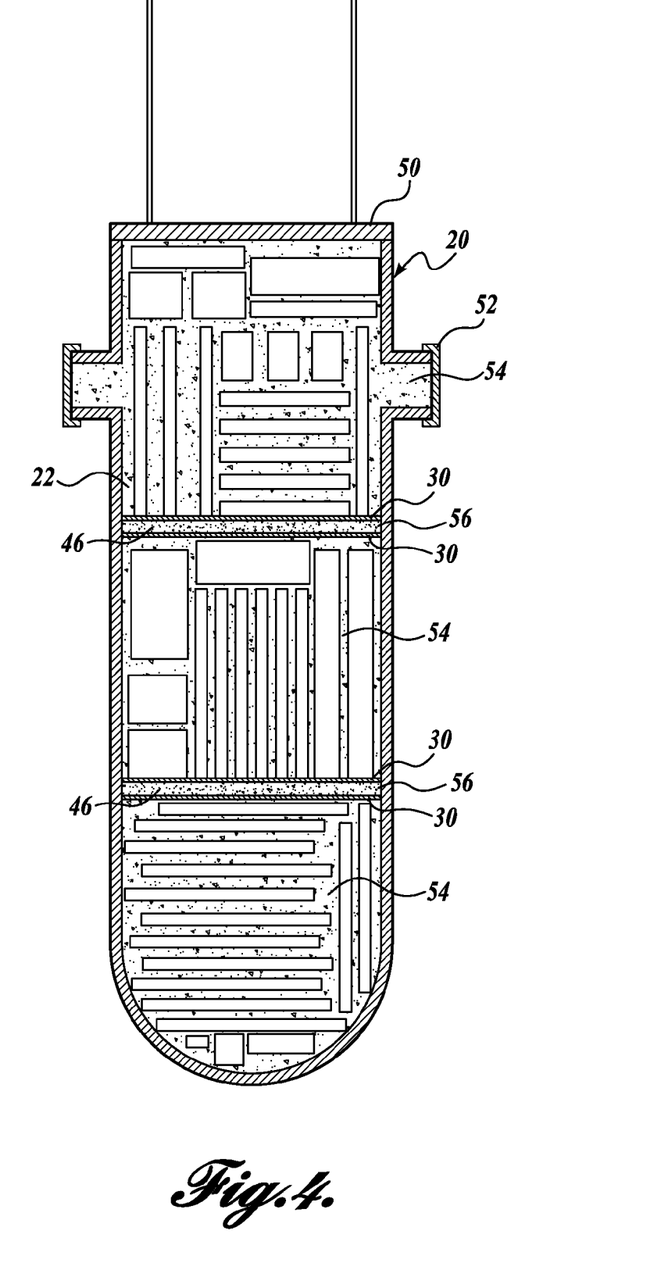
FIG. 4 is a cross-sectional view of the nuclear reactor vessel of FIG. 3 with the inner chamber of the vessel containing the repackaged internal components being encapsulated.

Referring to FIG. 4, with at least some of the internal components 22 rearranged and reinserted in the vessel 20, the vessel 20 can be encapsulated with an encapsulation material 54. Prior to encapsulation, adequate preparation of the reactor vessel 20 may be required, for example, attaching metal plates 50 and 52 to the vessel 20 top opening and to inner or outer ends of severed nozzles.

Figure 5A:
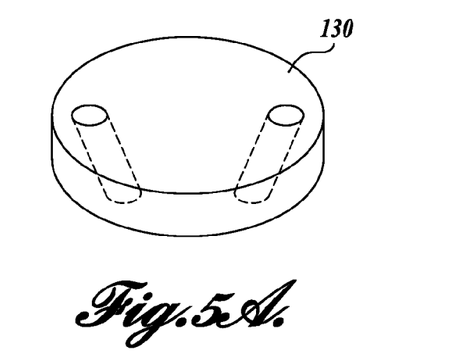
FIGS. 5A-5C are isometric views of various embodiments of different dividers for dividing the vessel into a plurality of sections.
Figure 5B:
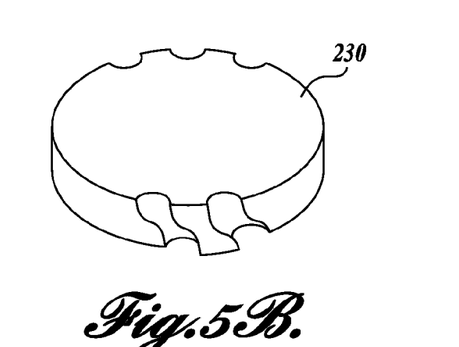
Figure 5C:
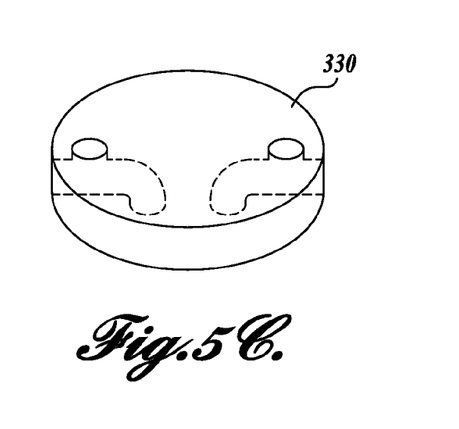

An encapsulation delivery system allows encapsulation of the internal components 22 within each vessel section 40, 42, and 44 and any other open space in the vessel 20. In one non-limiting example, hoses may be used to deliver encapsulation material 54 to each section 40, 42, and 44 and to space region 32, after cutting zones 46 have been set. As another non-limiting example, the dividers 30 or cutting zone 46 can be fabricated with holes or pathways to allow for the encapsulation material to pass through the dividers (see, for example, FIGS. 5A-5C). The dividers 130, 230, 330 shown in respective FIGS. 5A-5C have holes for enabling the encapsulating material to flow through them. The holes are designed to prevent direct exposition to radiation or "shine". The holes may take any appropriate shape to achieve the prevention of exposition to direct radiation, such as for example a dog-leg shape (FIG. 5C), a wave shape (FIG. 5B), or more simply and inclined shape (FIG. 5A).

Alternatively, the dividers 30 can be omitted provided that the internal components 22 are attached to the vessel prior to encapsulation in such a way that distinct groups or sections of internal components 22 are formed, leaving free space between the sections forming unencumbered cutting zones 46. During the encapsulation process for the sections 40, 42, and 44, the space region 32 between sections 42 and 44 and 40 and 42 forming an unencumbered cutting zone 46 also may be encapsulated.

Suitable encapsulation materials, such as grout, may be used to fill the sections 40, 42, and 44 of the vessel 20. Likewise, suitable encapsulation materials, such as grout made of cementitious or epoxy material, may be used to fill the space region 32 between sections 42 and 44 and 40 and 42. Different kinds of encapsulation materials may be used for different performance characteristics. For example, one type of grout may be advantageous for holding the internal components together in the vessel 20. Another type of material, such as low density grout may be advantageous for cutting. Suitable encapsulation materials include but are not limited to cementitious or epoxy grout, resin, glass, plastic, etc.

Referring to FIGS. 6B-7B, after the vessel 20 has been repackaged with unencumbered cut zones and encapsulated, the resulting vessel 20 is inserted into a container 60 for further encapsulation with encapsulation material 56. In the illustrated embodiment, the container 60 is cylindrical having a circular cross-section. However, in other embodiments of the present disclosure, the container 60 may have another cross-sectional shape, including but not limited to square or hexagonal cross-sections.

Figure 6A:
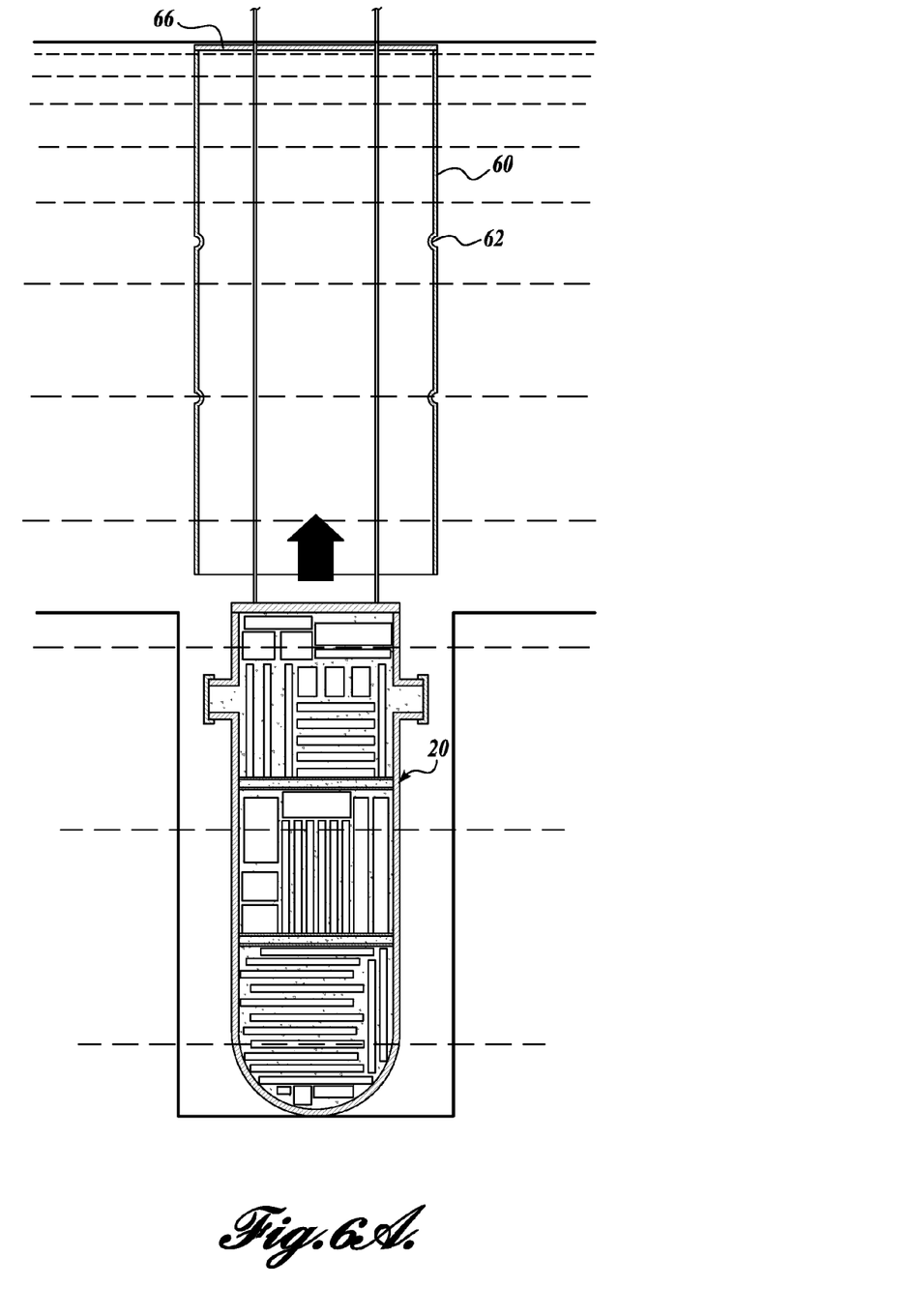
FIGS. 6A and 6B are cross-sectional views of the nuclear reactor vessel of FIG. 4 being lifted upward and placed into a container.
Figure 6B:
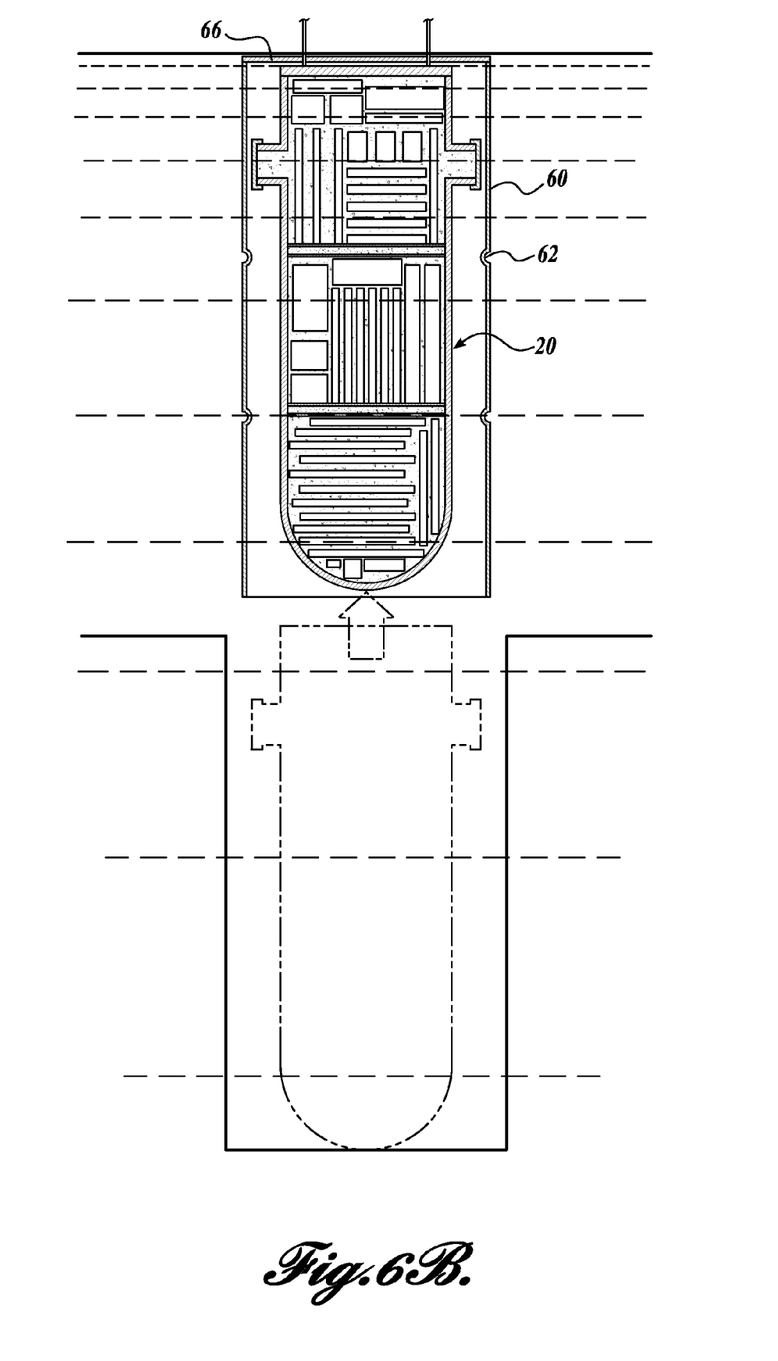

Referring to FIG. 6A, the vessel 20 is lifted into the container 60. In the illustrated embodiment, the container 60 is in the cavity with water. However, if the vessel 20 has been encapsulated and radioactively protected, this step may be performed as a dry step. The container 60 may include a top portion 66, or the top portion may be added after the vessel 20 has been lifted into the container 60. After the vessel 20 has been positioned in the container 60, a bottom plate (not shown) can be welded, fastened, or otherwise attached to the container 60.

Figure 7A:
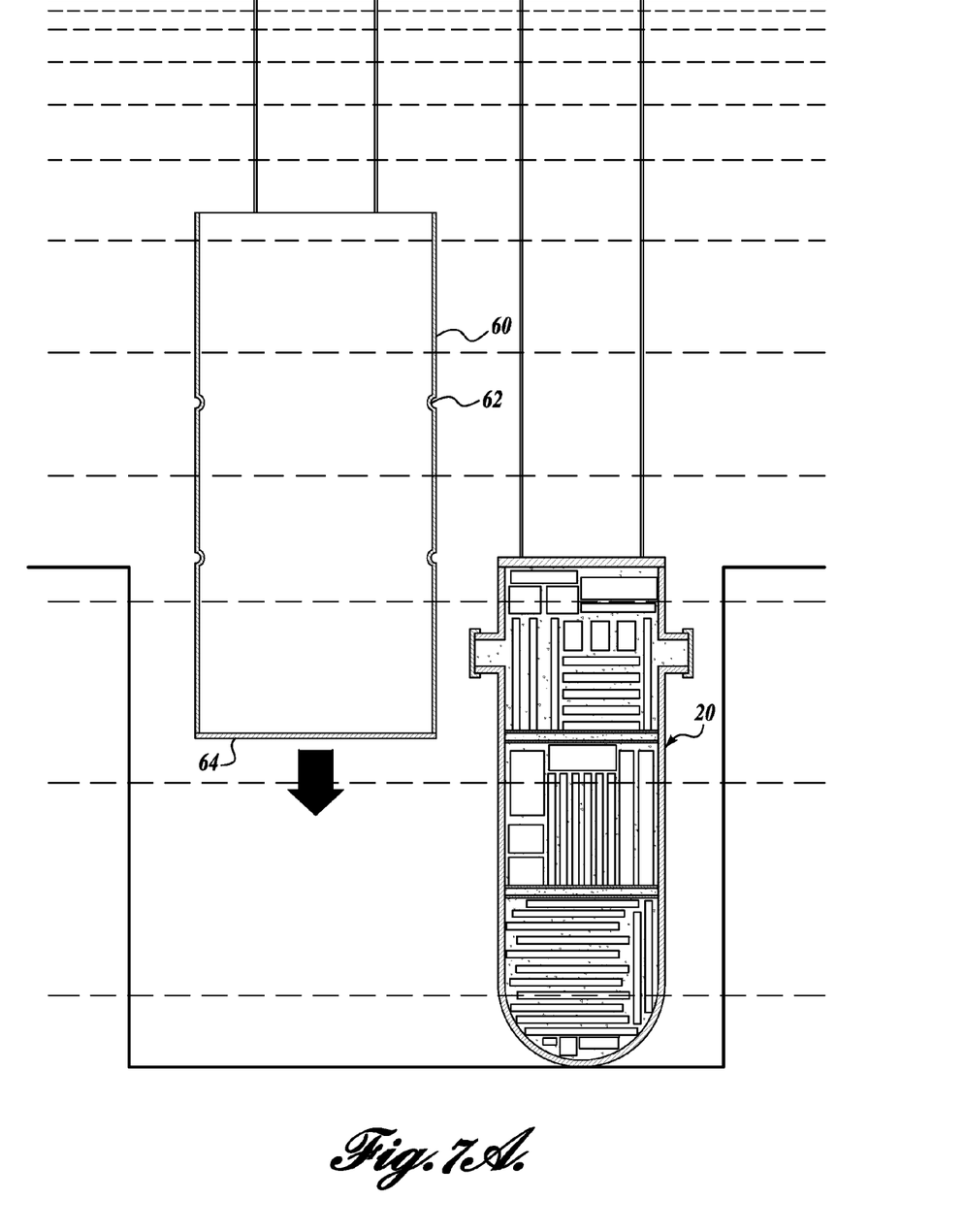
FIGS. 7A and 7B are cross-sectional views of the nuclear reactor vessel of FIG. 4 being moved and placed into a container.
Figure 7B:
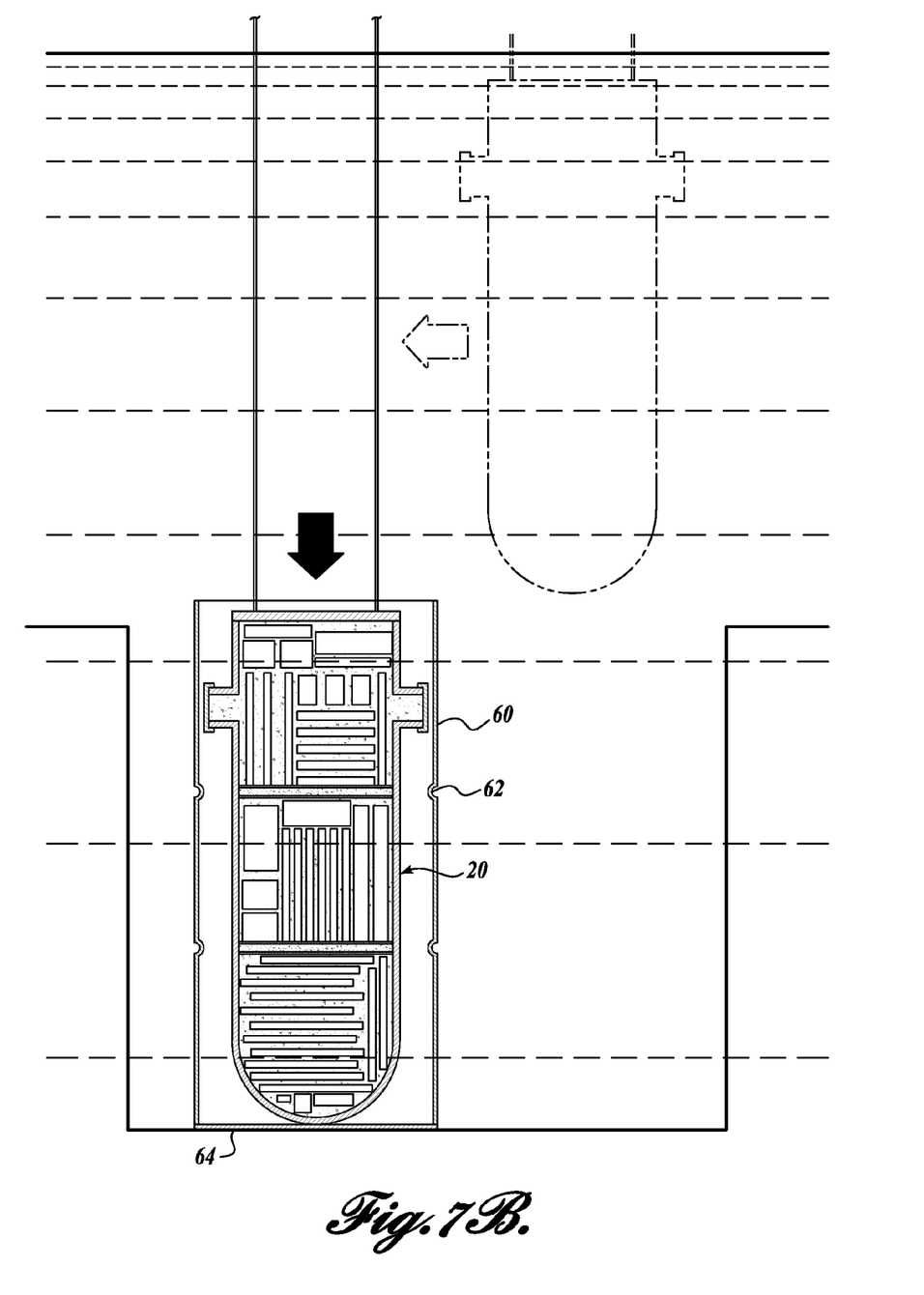

Referring to FIGS. 7A and 7B, an alternate method is provided. The container 60 is dropped to the bottom of the reactor cavity. The vessel 20 is lifted and placed into the container 60 (which already includes a bottom portion 64).

Figure 8:
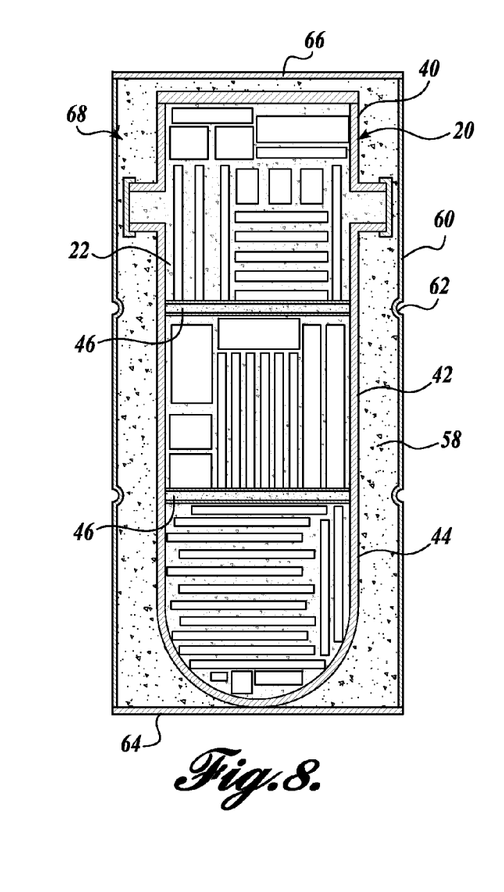
FIG. 8 is a cross-sectional view of the nuclear reactor vessel of FIG. 4 being encapsulated inside the container.

Referring to FIG. 8, after the vessel 20 is received in the container 60, the vessel 20 is encapsulated inside the container 60. Different or similar encapsulation materials 58, such as grout, may be used to fill the container 60 as used to fill the space regions 32 and sections 40, 42, and 44.

Figure 9:
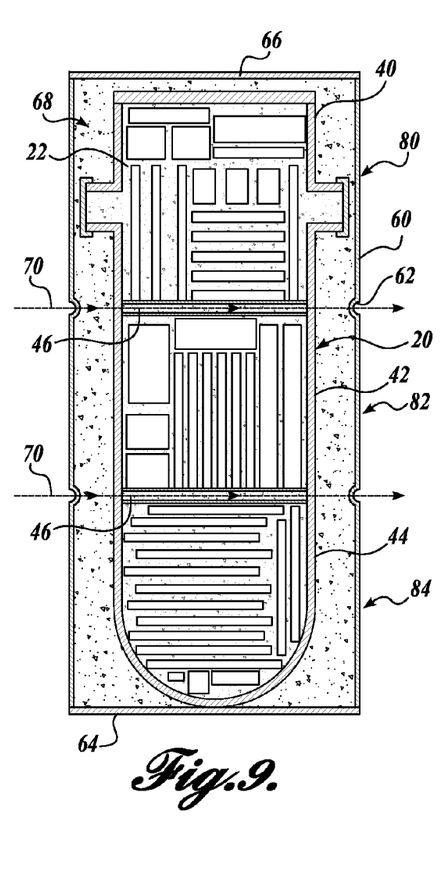
FIGS. 9 and 10 are cross-sectional views of the nuclear reactor vessel of FIG. 6B or 7B being subjected to segmentation and end cap installation.

Referring to FIG. 9, after encapsulation of the container 60, the package 68 can be segmented using a suitable segmentation technology, such as diamond wire cutting, to segment the whole package into transportable segments. Grooves 62 on the outer surface of the container 60 correspond with cutting zones 46 to provide alignment and positioning of the cutting means during the segmentation process of the package. The grooves 62 can be used for one or more non-limiting purposes: controlling segmentation path, aligning cutting equipment, cutting in the unencumbered cut zone.

The grooves 62 can be machined on-site after repackaging the internal components 22 into the vessel 20 to ensure the correct location to the cutting zones 46. For example, the grooves 62 could be machined by mechanical saw. Alternatively, the grooves 62 can be prefabricated during the manufacturing of the container 60.

Figure 10:
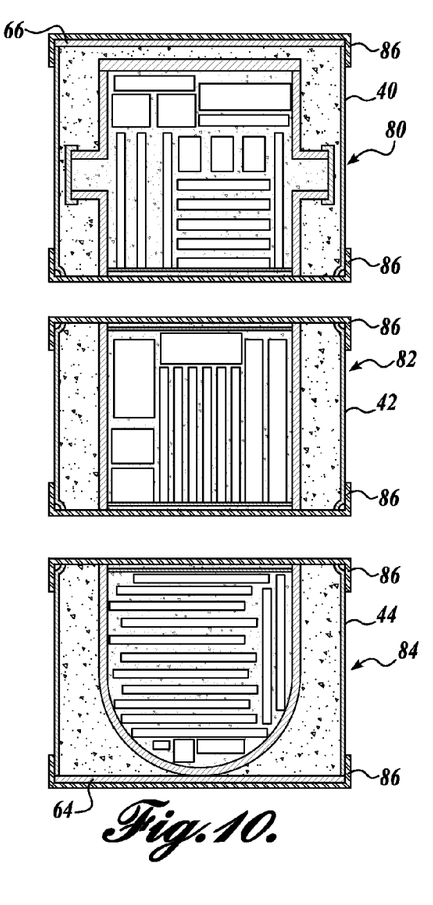

Referring to FIG. 10, after cutting, the cut segments 80, 82, and 84 of the package 68 will be sealed with material, such as end caps 86, attached to the cutting surfaces for the purpose of creating independent transportable packages compliant with relevant regulations. End caps 86 close the cut segments 80, 82, and 84 and provide radiological shielding to meet Nuclear Regulatory Commission transport requirements. End caps 86 can be installed on the free ends of the package before or after cutting. As an example, segments 80, 82, and 84 could be disc sections sealed with end caps 86 welded to the container cut edge. The segments 80, 82, and 84 can then be transported via road, rail, or barge to a licensed disposal site. The end caps 86, like the dividers 30, may be formed from metal, such as alloys of steel, lead, nickel, or other metals. The end caps 86 may also include neutron absorbing materials. In other embodiments of the present disclosure, the end caps 86 may be other non-metal structural materials, such as plastic or another inorganic material.

The end cap 86 may be designed and configured to include a skirt or similar feature that will allow for the end cap 86 to be installed and aligned, and to correct an uneven segmentation line. This design feature will maintain segment package integrity to comply with relevant regulation for such packages.

Accordingly, embodiments of the present disclosure are directed to whole package design including all the features which allow for the best decommissioning approach of removing the vessel 20 and internal components 22. The engineered package can be designed to allow for as many segments as needed for specific problem areas. Also, the design will accommodate the diamond wire cutting device to reduce the dose concerns and high secondary waste classifications.

In another embodiment of the present disclosure, a diamond wire cleaning chamber is provided. The wire will run through a cleaning chamber containing one or more water jet nozzles for ejecting pressurized water on the wire in different angles. The 360 degree wire cleaning effect will be supported by water reflections from the chamber walls opposite the nozzle. The nozzle may contain a concave shaped inlay to focus the reflections. Brushes (e.g., ring shaped brushes) clean the wire from water and residue before leaving the chamber. The flow of removed material and water can be supported by either installing the device in an angle or designing the lower part of the chamber (below or around the concave inlay) as a labyrinth guided into a potentially vacuuming disposal tube that provides low pressure to prevent the excessive emission of contaminated water mist. For cleaning purposes, the nozzle/brush part can be designed as an independent unit mounted and sealing to the initially top-open chamber.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the disclosure in which an exclusive property or privilege is claimed are defined as follows:

1. A method of decommissioning a nuclear reactor including a vessel defining an inner chamber and reactor internal components positioned within the inner chamber, the method comprising:
    removing at least some of the internal components;
    repackaging at least some of the removed internal components in at least one of the first and second predefined sections of the vessel defining a cutting zone between the at least first and second predefined sections;
    disposing the vessel in a container; and
    encapsulating the internal components in the vessel and encapsulating the vessel in the container to generate a package.

2. The method of claim 1, further comprising cutting the vessel substantially along a plane through the cutting zone to divide the package into at least two sub-packages.

3. The method of claim 2, further comprising affixing end caps to the sub-packages after cutting the package into sub-packages.

4. The method of claim 3, wherein the end caps have a skirt.

5. The method of claim 1, wherein the internal components are entirely contained within at least one of the first and second predefined sections.

6. The method of claim 1, wherein repackaging the internal components includes repositioning the internal components and inserting a cutting zone in the vessel.

7. The method of claim 6, wherein the cutting zone includes first and second dividers spaced a predetermined distance from one another to define a space therebetween.

8. The method of claim 7, further comprising a cutting material disposed between the first and second dividers.

9. The method of claim 1, wherein defining the cutting zone includes inserting a prefabricated divider assembly including first and second dividers.

10. The method of claim 1, wherein defining the cutting zone includes inserting first and second dividers in the vessel, the first and second dividers spaced a predetermined distance from one another.

11. The method of claim 10, further comprising disposing a cutting material between the first and second dividers.

12. The method of claim 1, wherein a divider acts as the cutting zone.

13. The method of claim 7, wherein the dividers are made from a structural material.

14. The method of claim 7, wherein the dividers are attached to the interior surface of the vessel.

15. The method of claim 7, wherein the dividers include one or more pathways to allow the encapsulation material to pass through to adjacent sections.

16. The method of claim 1, comprising packaging other irradiated components from the nuclear reactor into the vessel prior to encapsulating.

17. The method of claim 1, wherein selected internal components positioned within at least one of the first and second predetermined sections remain within the vessel.

18. The method of claim 1, wherein the container includes exterior circumferential grooves to align with the cutting zone in the vessel.

19. The method of claim 18, further comprising using a diamond wire to cut the cutting zones in the vessel.

20. The method of claim 1, wherein at least a portion of the cladding of the vessel interior is removed prior to repackaging near or at the cutting zones.

* * * * *